Patented Jan. 28, 1936

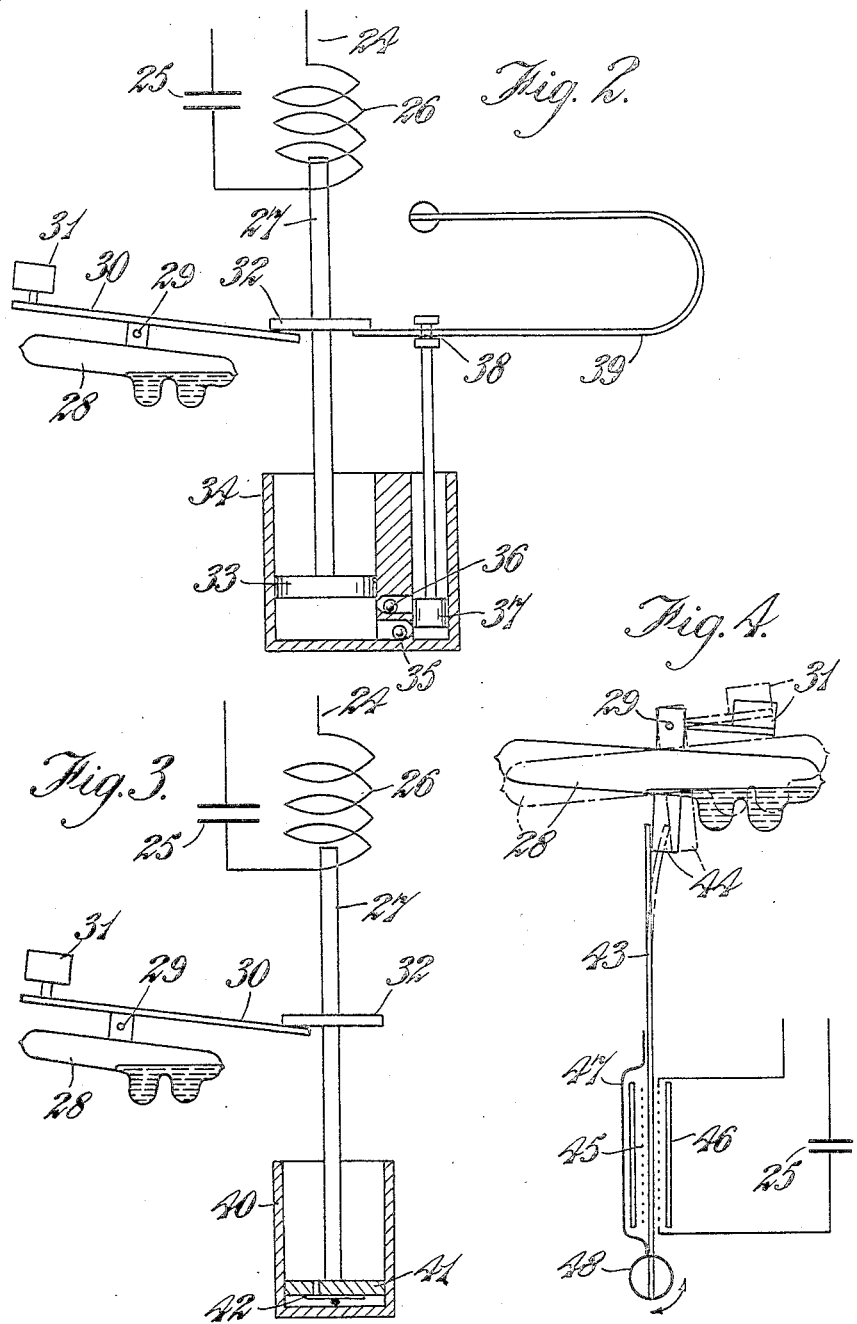

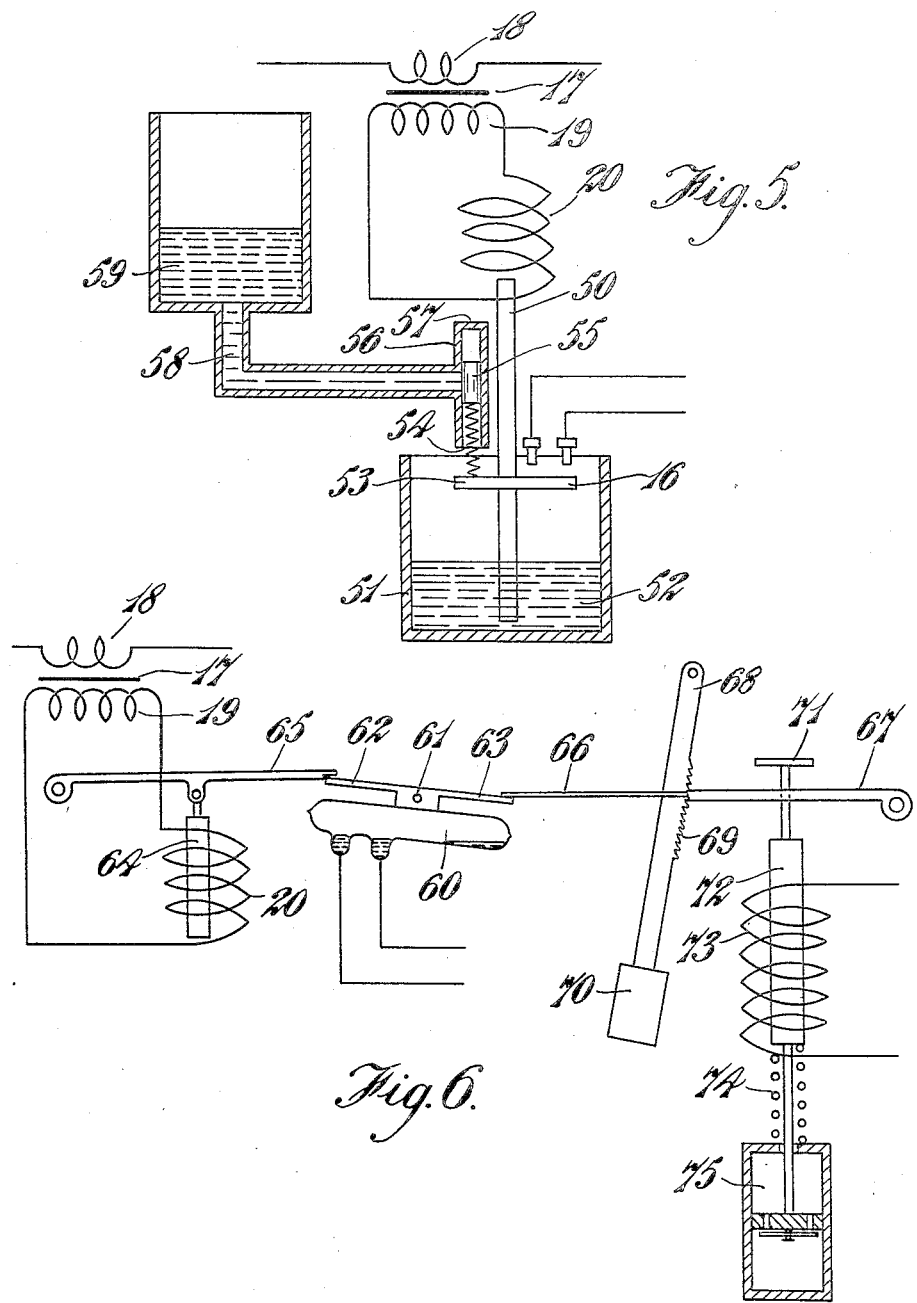

2,029,069

UNITED STATES PATENT OFFICE 2,029,069

REMOTE CONTROL SYSTEM FOR ELECTRIC SUPPLY NETWORKS

Edison Hallowell, West Park, Leeds, England, assignor to Northern Utilities Trust Limited, Leeds, Yorkshire, England Application October 26, 1934, Serial No. 750,230
In Great Britain October 30, 1933

15 Claims. (Cl. 171—97)

This invention relates to remote control systems for electric supply networks and particularly systems for controlling the supply of current to particular energy consuming devices located at remote points of said network of the kind wherein impulses of suitable frequency are superposed on the supply network or on an auxiliary network.

In practically all power supply networks the load is divided into two or more classes, namely loads which may exist at any time and loads which are restricted in their application to the supply network to certain periods of the day and night. These latter loads are in general charged at special reduced tariff rates and may be the so-called "off-peak" loads. Loads of this nature may for example be consequent on devices for water liquor, sewage, or hydraulic pumping, central and domestic heating, domestic cooking, refrigeration and the like and in consequence of their "off-peak" character, they are usually provided with some form of storage in the form of heat, water, cold, or the like to enable them to remain effective during the periods of peak load. Such loads will be hereinafter termed restricted loads.

One object of this invention is to provide a cheap and effective system and apparatus for controlling the supply of current to consumers of restricted load. Another object of the invention is to improve continuity of supply of current to such consumers.

A further object of the invention is to reduce to a minimum the amount of energy storage medium necessary for such consumers.

According to the present invention the remote control of the restricted load is brought into operation automatically on increase of the total load above a set value. This value may for example be the maximum or peak load value of normal unrestricted load.

Since there will be a plurality of such controlled apparatus forming the restricted load, it is desirable to provide a gradual transition from one state of load to another and in accordance with a further feature of the invention means are provided for the automatic switching off of the said load in units successively, until the overload is relieved.

As above mentioned, restricted load consumers are usually provided with energy storage medium and in order to provide a more selective control of restricted load by another feature of the invention the said load is switched off automatically and successively in units each unit being disconnected for a period dependent on the proportion of the existing energy storage capacity to the maximum capacity thereof.

For example, in the case of thermal storage apparatus the switching off of the load may be effected automatically in such a manner that the installation having the lowest proportion of heat storage relatively to the maximum heat storage is the last to be switched off and, on reduction of the overload, is the first to be switched in. This action in the above case may be produced by combining the controlling action of the remote switch operated by the selected frequency impulse with a time lag device variable in action according to the temperature of the stored medium. In the case of an electrically operated pumping load, the action of the time lag device may be dependent on the level of liquid in the storage reservoir into which the pumping load is discharging.

In practical operation of a power distributing network the normal unrestricted load increases from time to time and the value of the load at which the remote switching operation becomes effective will have to be similarly increased.

In accordance with a further feature of the invention means are provided for resetting automatically the load value at which the remote controlling function is adapted to operate. In other words, the controlling device is adapted to discriminate between increases in restricted load and in normal unrestricted load.

The invention will be hereinafter described in its application to the remote control, for example the switching off, of a restricted load, such as a thermal storage load, supplied by alternating current power distribution networks, the frequency of the control impulses being of any suitable value higher or lower than the frequency of the power circuit and hereinafter termed selected frequency.

These, and other features of the invention, will be described more fully in the following specification with reference to the drawings accompanying and forming part of this specification. In these drawings:—

Fig. 2 shows diagrammatically a remote control switch fitted with a thermostat control and one form of time lag device.

Figs. 3 and 4 show a remote control switch fitted with modified thermostat controls and time lag devices.

Figs. 5 and 6 show diagrammatically two different embodiments of an automatic resetting device for the load value causing operation of the control impulses.

Figure 1:
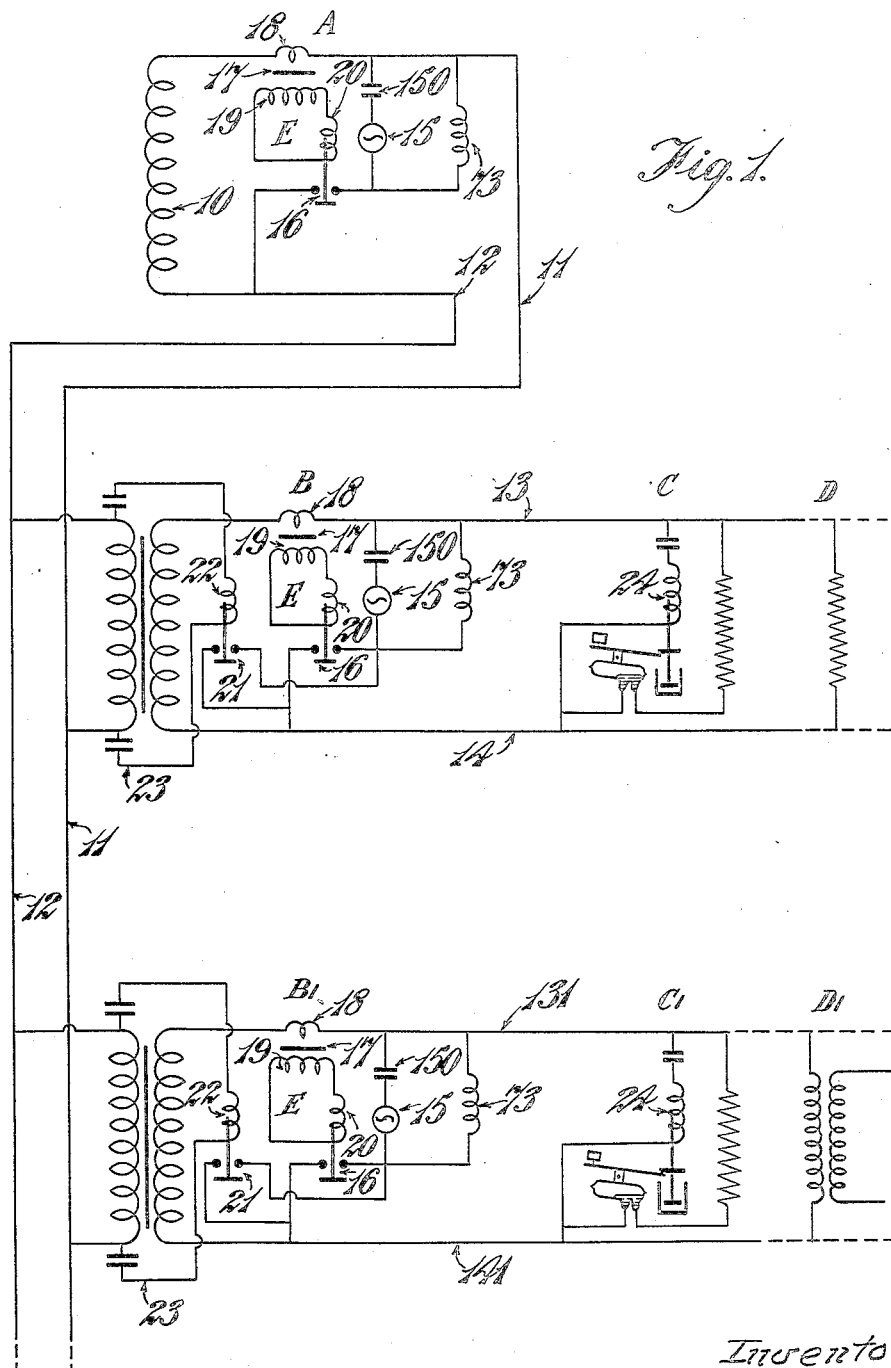
Fig. 1 shows a diagrammatic lay out of a supply network provided with a control system constructed and arranged in accordance with the invention.

Referring to Fig. 1 a main source of supply A represented diagrammatically by a coil 10 feeds a supply network 11, 12 across which are connected static substations B, B₁ ... These substations in turn feed consumers' power mains 13, 14 and 13¹, 14¹ respectively with current of suitable voltage and across the power mains 13, 14 etc. are connected various consumers' loads, the normal loads being indicated diagrammatically by D, D₁ . . . and the consumers of restricted (or off peak) loads by C, C₁ . . .

At the main supply station A and at each of the substations B there is arranged a control device operating on a selected frequency adapted to control the restricted loads C, C₁ . . . These are provided, as shown at E, since the maximum loading on an individual substation may not coincide with the maximum load at the main supply owing to the different loadings at the substations.

It is thus clear that the maximum load on the substations B, B₁ etc. is controlled by their respective control devices E but that a master control is produced by the control device E at the main supply A.

The control current of selected frequency may be generated by any known means. In the illustrated embodiment at each of the main supply sources A and substations B, there is provided an alternator 15 of selected frequency in series with a condenser 150 which is connected across the mains 11, 12, or 13, 14 or 131, 141 respectively and is adapted to be brought into operation by a switch 16 actuated according to the load on the respective mains. For this purpose a current transformer 17 is arranged with its primary 18 in the main circuit and its secondary 19 in series with an overload coil 20, adapted to close the switch 16 thereby closing the control circuit of selected frequency through the alternator 15 and condenser 150 when the load in the respective mains exceeds a predetermined value.

In addition, at each substation there is an additional switch 21 controlled by an overload coil 22 forming part of a tuned circuit 23 connected across the main supply mains 11, 12 and responsive to the impulses of selected frequency generated by the alternator 15 at the main supply station A. In this way the control circuit of selected frequency at each substation is adapted to be closed consequent on an overload either at said substation or at the main supply station A.

The control current of selected frequency may be generated by any known means other than the arrangement shown in Fig. 1 and superposed on the power mains in any desired manner. Further, these currents may be superposed on conductors other than the power mains, such as telephone conductors or if desired separate conductors may be used in which latter case the control current may comprise direct current impulses of any desired duration.

At each of the consumers of restricted load C there may be provided an arrangement as described with reference to any of Figs. 2, 3, or 4. The device shown in Fig. 2 comprises a circuit 24 tuned to the selected frequency, and including a condenser 25 and an inductance 26. The circuit also includes an electromagnetic switch the coil of which may comprise either the inductance 26 as illustrated or a separate coil. The circuit 24 is connected across the mains 13, 14 or 131, 141, etc.

Associated with the electromagnetic coil 26 is an armature 27 which forms the operative member of the remote control switch. The switch element itself as illustrated consists of a mercury switch 28 mounted on a lever 30 tiltable about a pivot 29. The lever 30 carries at one end a weight 31 and at the other is adapted to contact an abutment 32 mounted on the armature 27. Switch 28 is normally held closed by the weight of armature 27.

At its lower end the armature 27 carries a piston 33 which moves in a fluid containing cylinder 34. The latter is provided with inlet and outlet valves 35 and 36 respectively and in conjunction with the piston 33 forms a time lag device. The degree of opening of the valves 35 and 36 is dependent on the position of a plunger 37 which slides along the outer face of cylinder 34 and is controlled by a thermostat or other control device 38 as hereinafter described. As illustrated this consists of a bimetallic or other strip 39 responsive to the temperature of the thermal storage medium and so connected to plunger 37 that the higher the temperature of said medium the more will the plunger open the inlet valve 35 and close the outlet valve 36. In this way the dash pot action of piston 33 moving in cylinder 34 is relieved and the opening movement of switch 28 is accelerated. On the other hand on closing of the switch with a high temperature of the stored medium a delaying action would result.

Conversely, with a low temperature of said medium the control device 38 would position the plunger or slide 37 so as to close the inlet port 35 and open the outlet port 36, thus delaying the opening of the switch 28, and accelerating the closing thereof.

The control device 38 is constructed and arranged to open the switch 28 independently of the action of the tuned circuit in that when the temperature of the stored medium has reached a predetermined limit the device 38 contacts the abutment 32 and raises armature 27 to allow the switch to open under the action of the weight 31 subject to minimum dash pot delaying action.

The modified remote control switch illustrated in Figure 3 is somewhat simplified as compared with that of Figure 2. It consists as in Fig. 2 of a tuned circuit 24, 25 electromagnetic coil 26, armature 27, abutment 32, lever 30, switch 28 and weight 31, the switch being normally held closed by the weight of the armature 27. The action of operation of the switch is also similar to that described in the previous figure. The time lag device, however, here consists of a cylinder 40 filled with oil or other viscous liquid the viscosity of which is variable according to the temperature, and for example mounted in contact with the cylinder or other container (not shown) of the stored medium. Arranged so as to be movable within the cylinder 40 is a piston 41 having a non-return or one-way valve 42 of restricted area arranged to open on upward movement to facilitate said movement and to close on downward movement to retard the same.

With this arrangement the time necessary to open the mercury switch 28 will depend on the temperature of the storage medium and the hottest apparatus will be the first to be switched off. The movement of the armature 27 is free to continue for a certain distance after the mercury switch is opened and owing to the increasing magnetic flux passing through coil 26 due to the diminishing air gap, the movement accelerates as the armature rises. Under peak load conditions the result is that the armature controlling the hottest tank will have reached its highest position at the time the armature controlling the coldest tank has reached the minimum position necessary to open the mercury switch. The return movement of the armature due to gravity or spring control takes place at a constant rate throughout the full stroke in each case dependent only on the viscosity of the liquid in cylinder 40 opposing the weight of the armature 27 and the combined action is such that the switch which first opens on increase of normal load is the last to close on decrease of said load.

The opening of the switch due to temperature only, independently of the control impulse, is preferably effected by making the lever 30 in the form of a bimetallic strip which is adapted to bend or curve downwardly under the action of heat conducted from the storage medium thus allowing the switch 28 to move to the off position under the influence of the weight 31 independently of the position of armature 27. This additional movement also assists the operation of the time lag device in that with increase of temperature of the medium the necessary movement of the armature 27 prior to allowing the switch to open is reduced and vice-versa on closing is increased.

Fig. 4 shows a modified simple control switch which is assumed to be in contact with a thermal storage tank (not shown). In this embodiment the mercury (or other) switch 28 pivots about a pin 29 and is normally held closed by a weight 31 or by a spring. A bimetallic strip 43 held at its lower end contacts at its upper end with an abutment 44 on the switch 28. With increasing temperature of the storage tank the upper end of the strip 43 is adapted to bend to the right as shown in dotted lines in the figure thus moving switch 28 into its open position. The temperature of the stored medium in the storage tank thus exerts thermostatic control on the switch 28.

In addition to the thermostatic control the control current of selected frequency is adapted to open the switch 28 by the provision of a heating coil 45 connected to a condenser 25 or other suitable impedances for receiving the control current. The latter thus heats the bimetallic strip 43 and causes it to bend to the right as indicated to operate switch 28. The heating coil 45 is surrounded by asbestos or other lagging 46 so that the bimetallic strip 43 remains under the influence of the heat after actuating switch 28 for some time after the flow of the control current in order to introduce sufficient time lag in the reclosing action of the switch.

The control current acts in conjunction with the thermostatic control in that with a low temperature of thermal storage medium, the strip 43 remains in its extreme left hand position and the control current must persist longer to bend the strip 43 into the position where it actuates switch 28. Conversely on reclosing of the switch 28 after actuation by the control current, the time taken for strip 43 to move into its non-operative position depends on its temperature due to the control current and also on that due to the storage medium.

It is to be understood that the strip 43 is mounted in heat conductive relation with the storage medium so that the temperature of the latter will also control the rate of heat dissipation from the lagged portion of the strip and thus with higher temperatures the greater will be the time lag introduced in the reclosing of switch 28.

The strip 43 is preferably constructed, at least in part, of magnetic metal and in conjunction with an iron connecting element 47 forms a magnetic circuit which increases the inductance of coil 45 so as to form a suitable coupling with the condenser 25 for the control current of selected frequency. The strip 43 may with advantage be mounted on a rod or pivot 48 rotatable by hand to form a variable setting for the thermostatic control. Alternatively, the heating element 45 instead of directly surrounding strip 43 may be otherwise arranged in heat conductive arrangement with strip 43.

Various modifications may be made in the above described control switches, for example in practice it will usually be necessary to interpose a relay circuit to amplify the control current and to effect the switching operation. Alternatively, the switch may be operated through any known ratchet mechanism. Further, any suitable delaying devices other than dash pots may be used if desired.

While the above control switches have been hereinbefore described with reference to the control of thermal storage load, they may, as previously mentioned, readily be adapted for any form of restricted load. For example in the case of pumping load the level of water in a storage reservoir into which a pump is discharging may be caused by suitable means such as a float to vary the position of the plunger 37, Fig. 2. Alternatively, where the time lag effect is dependent on temperature as in Figs. 3 and 4 this temperature may be varied, by means of a rheostat which controls a heating element in heat conductive contact with the control switch and which is actuated by a float or other means.

The operation of the system above described with reference to Figs. 1-4 is briefly as follows:—

With normal load conditions, the circuit of the selected frequency control generators at the main station A and substations B, B₁, ... is open and the apparatus switches C, C₁, ... subject to control are closed by gravity or spring action. When the power load exceeds the set value either at the main or at a substation, the overload control coil 18 at that point closes the control circuit to superpose a control impulse of selected frequency on the power mains. This control impulse energizes the tuned air circuits at each apparatus C, C₁ ... to open the load switches 28 subject to the duration of the impulse and the delaying action of the particular time lag provided, which in turn is dependent on the thermostatic or other control adapted to measure the stored heat or energy.

With a plurality of "off-peak" or restricted load consumers in circuit, there is thus a progressive reduction of the power load depending on the duration of the control impulse and on the stored energy such as heat available at each of the said apparatus C, until the overload at the main or substation is relieved when the termination of the overload current through coil 18 opens the selected frequency impulse generating circuit.

If subsequently, the normal unrestricted load continued to increase further control impulses would be sent out at intervals according to the sensitivity of the overload control circuit switches until the whole of the restricted load would have been put out of circuit at which point, peak load conditions would exist.

Simultaneously the apparatus switches at C, C₁ ... would gradually be reclosed by mechanical means subject to the delaying action of the time lag device and the thermostatic or other control and, if the overload still persisted, a further impulse of selected frequency would be generated as before to open the requisite number of circuits to reduce the load. This sequence of operations would continue until the normal unrestricted power load had decreased sufficiently to allow the whole of the restricted load to remain in circuit.

It is to be understood that the duration of the delaying action of the time lags while the switch is being reclosed by mechanical means is great compared with the delay action during opening of said switches in order to prevent repeated switching off of the restricted load during the persistence of the overload. In the former case the delay action may be of the order of 20–30 minutes as compared with 1–30 seconds in the latter.

In the abovementioned manner the consumers least able to dispense with the current supply are disconnected from the supply network for the minimum time, the automatic control thus exercising a discriminating action on the consumers of restricted load. It is, however, not essential that the units controlled in succession should be selected in accordance with their current requirements. Such units may be preselected by suitable adjustment for example of the time lag devices so that certain consumers' apparatus are responsive to impulses of one duration and/or intensity, other apparatus are responsive to impulses of other durations and/or intensities or to different additive effects of a succession of impulses. For example, the plunger 37 of Fig. 2 may be initially set manually to give a definite time lag for the switching off operation and/or for the switching in operation. This initial manual setting may vary in pre-selected groups of consumers' apparatus so that one group will operate with an impulse of one duration or intensity while another group operates with impulses of another duration and/or intensity.

Alternatively, the control currents may be selective by having variable selected frequencies, the control circuits of certain apparatus being responsive to one frequency, those of other apparatus to other frequencies.

Figure 5 shows a device which is adapted to reset automatically in an upward direction the value at which the overload control coil 18 and switch 16 will operate with increase of the normal unrestricted load. Such a device prevents the selected frequency control current from flowing for an indefinite period, and also prevents consumers of restricted load from being subsequently disconnected unnecessarily in the cases where the overload is due to an increase of the normal unrestricted load. This is advisable because in certain systems the local supplier of electrical energy is charged by the bulk or main supplier according to the maximum demand recorded over a given period and therefore with any subsequent less demand, the necessity of disconnecting the consumers of restricted load is obviated. In Figure 5 is shown the current transformer 17 with primary winding 18 in series with the line and secondary winding 19 in series with overload coil 20. The armature rod 50 of switch 16 controlled by the current in coil 20 carries a container 51 adapted to hold a liquid 52 such as mercury. Rod 50 also carries an abutment 53 which contacts one end of a compression spring 54 bearing at its opposite end against a sliding piston valve 55 movable in a cylinder 56 closed at its inner end 57 and filled with liquid. Valve 55 controls the mouth of a supply conduit 58 connected to a reservoir 59. The outer end of cylinder 56 communicates freely with the container 51.

The operation of this control device is as follows: When an overload current passes through primary winding 18, armature rod 50 is moved upwardly to close switch 16 and to superpose the selected frequency control current on the mains. Upward movement of abutment 53 compresses spring 54 which slowly forces piston valve 55 into the cylinder 56 against the pressure of the liquid therein, which leaks past the inner end of piston valve 55 into the conduit 58. The delaying action on the piston valve is such that when the selected frequency current has continued for a sufficient period to disconnect the whole of the restricted load and the over-load still persists, the piston uncovers the mouth of conduit 58 and allows liquid to flow into the container 51 from reservoir 59. This flow continues until the additional weight on armature rod 50 is sufficient to restore the armature to the position where switch 16 is opened. In all subsequent operations, therefore, the selected frequency circuit through switch 16 will not be closed until the overload exceeds the value determined by this new setting.

Fig. 6 shows a modified and preferred embodiment of the automatic setting device which avoids the addition of liquid as a resetting means. In this figure the switch 16 of Fig. 1 is in the form of a tiltable mercury switch 60 mounted on a pivot 61 with two oppositely extending arms 62, 63. As before switch 60 is closed by the action of an armature 64 influenced by an overload coil 20 fed from the secondary winding 19 of a current transformer 17. For this purpose armature 64 is connected with a pivoted lever 65 adapted to contact with arm 62 of switch 60.

The switch 60 is normally held in its open position by a spring 66 bearing against arm 63, the spring 66 being carried by a pivoted lever 67. The end of lever 67 engages with an inclined pivotally mounted ratchet arm 68 having teeth 69 and held against lever 67 by a weight 70, the teeth 69 thus holding spring 66 in any set position. The setting of spring 66 is increased by an abutment 71 on an armature 72 adapted to be energized by a coil 73. The latter is connected in series with switch 60 or 16 across a source of supply such as the mains 11, 12 or 13, 14 etc. as shown in Fig. 1. Armature 72 is provided with a time lag device in the form of a spring 74 and dash pot 75.

The action of this resetting device is as follows:— When overload coil 20 is energized armature 64 by lever 65 and arm 62 closes switch 60. This superposes current impulses of selected frequency on the mains and also energizes coil 73. Armature 72 then moves downwardly against the action of spring 74 and dash pot 75. The time lag of the latter is such that abutment 71 will not contact lever 67 until the selected frequency current has persisted long enough to remove all the apparatus of the restricted load out of circuit. If then the overload ceases, switch 60 is opened and armature 72 is returned quickly by spring 74. If, however, the overload persists on disconnection of all the restricted load then abutment 71 contacts lever 67 causing spring 66 to bear on arm 63 to open switch 60. Lever 67 and spring 66 are held in this set position by the teeth 69 on ratchet arm 68. Armature 72 and abutment 71 are returned immediately by spring 74, the dashpot action on the upward movement being relatively slight. The control device can be set manually at desired periods by releasing lever 67 on moving lever 68 to the left.

Instead of overload coil 20 and pivoted lever 65, a thermal responsive element such as a bimetallic strip may be arranged in series with secondary winding 19 to close switch 60 when overload current flows through said strip. It is to be noted also that the time lag 74, 75 will be greater at the sub-stations B, B₁ ... than that at the main station A to prevent the control device being reset automatically when selected frequency currents from main station A close the switches 21 at the substations.

The sensitivity of the overload coils 20, Figs. 5 and 6 may, if desired, be reduced by connecting the time lag device to armatures 50 and 64 so as to prevent operation of the switches 16 and 60 in the event of a transient overload.

What I claim is:—

1. In an electrical supply network having at least one control station and a plurality of remote current consuming devices of restricted load character connected to said network, a control system which comprises means at said control station to generate control current impulses in response to an increase of the total load on said network above a set value and switch means at said consuming devices of restricted load responsive to said control current impulses to disconnect said devices from said network.

2. In an electrical supply network having at least one control station and a plurality of remote current consuming devices of restricted load character connected to said network, a control system which comprises means at said control station to generate control current impulses in response to an increase of the total load on said network above a set value, means to superpose said control current impulses on said supply network and switch means at said consuming devices of restricted load responsive to said control current impulses to disconnect said devices from said network.

3. In an electrical supply network having at least one control station and a plurality of remote current consuming devices of restricted load character connected to said network, a control system which comprises means at said control station to generate control current impulses in response to an increase of the total load on said network above a set value, switch means at said consuming devices of restricted load responsive to said control current impulses to disconnect said devices from said network and mechanical means at each of said consuming devices of restricted load for the individual re-closing of said switch means.

4. In an electrical supply network having at least one control station and a plurality of remote current consuming devices of restricted load character connected to said network, a control system which comprises a control member at each control station energized by an overload in said network, a control current circuit at each control station energized on actuation of said control member, a generator of selected frequency currents in said control circuit, means to superpose said selected frequency currents on said network, a load switch on each consuming device of restricted load responsive to said selected frequency currents to disconnect said restricted load from said supply network and mechanical means at each consuming device of restricted load to re-close said load switch.

5. In an electrical supply network having at least one control station and a plurality of remote current consuming devices of restricted load character connected to said network, a control system which comprises a control member at each control station energized by an overload in said network, a control current circuit at each control station energized on actuation of said control member, a generator of selected frequency currents in said control circuit, means to superpose said selected frequency currents on said network, a load switch at each consuming device of restricted load connecting said device to said supply network, an actuating member at each of said devices responsive to said selected frequency currents and movable to cause opening of said load switch and mechanical means at each consuming device of restricted load to re-close said load switch.

6. In an electrical supply network having at least one control station and a plurality of remote current consuming devices of restricted load character connected to said network, a control system which comprises a control member at each control station energized by an overload in said network, a control current circuit at each control station energized on actuation of said control member, a generator of selected frequency currents in said control circuit, means to superpose said selected frequency currents on said network, a load switch at each consuming device of restricted load connecting said device to said supply network, an actuating member at each of said devices responsive to said selected frequency currents and movable to cause opening of said load switch, a time lag member controlling the movement of said actuating member to delay opening of said load switch, mechanical means at each consuming device of restricted load to re-close said load switch and a time lag member delaying the mechanical closing of said load switch.

7. In an electrical supply network having at least one control station and a plurality of remote current consuming devices of restricted load character connected to said network, a control system which comprises a control member at each control station energized by an overload in said network, a control current circuit at each control station energized on actuation of said control member, a generator of selected frequency currents in said control circuit, means to superpose said selected frequency currents on said network, a load switch at each consuming device of restricted load connecting said device to said supply network, an actuating member at each of said devices responsive to said selected frequency currents and movable to cause opening of said load switch, a time lag member controlling the movement of said actuating member to delay opening of said load switch, mechanical means at each consuming device of restricted load to re-close said load switch and a time lag member delaying the mechanical closing of said load switch, each of said time lag members being continuously variable according to the current requirements of said consuming devices.

8. In an electrical supply network having at least one control station and a plurality of remote current consuming devices of restricted load character provided with thermal storage medium and connected to said network, a control system which comprises means at said control system to generate control current impulses in response to an increase of the total load on said network above a set value, means to superpose said control impulses on said network, a load switch at each consuming device of restricted load connecting said device to said network, an actuating member at each of said devices responsive to said control current impulses and movable to cause opening of said load switch, mechanical means at each of said restricted load consuming devices to reclose said load switch and a time lag member controlling the opening and closing of said load in dependence on the temperature of said thermal storage medium.

9. In an electrical supply network having at least one control station and a plurality of remote current consuming devices of restricted load character provided with thermal storage medium and connected to said network, a control system which comprises means at said control system to generate control current impulses in response to an increase of the total load on said network above a set value, means to superpose said control impulses on said network, a load switch at each consuming device of restricted load connecting said device to said network, a thermally responsive actuating member at each of said devices mounted adjacent said thermal storage medium and movable by said control current impulses to cause opening of said load switch, the movement of said actuating member being regulated by heat radiated from said thermal storage medium, mechanical means at each of said restricted load consuming devices to reclose said load switch and a time lag member controlling the opening and closing of said load in dependence on the temperature of said thermal storage medium.

10. In an electrical supply network having at least one control station and a plurality of remote current consuming devices of restricted load character provided with thermal storage medium and connected to said network, a control system which comprises means at said control system to generate control current impulses in response to an increase of the total load on said network above a set value, means to superpose said control impulses on said network, a load switch at each consuming device of restricted load connecting said device to said network, an actuating member at each of said devices responsive to said control current impulses and movable to cause opening of said load switch, mechanical means at each of said restricted load consuming devices to reclose said load switch, a time lag member controlling the opening and closing of said load switch in dependence on the temperature of said thermal storage medium and a thermostat element controlling the operation of said load switch according to the temperature of said thermal storage medium.

11. In an electrical supply network having at least one control station and a plurality of remote current consuming devices of restricted load character connected to said network, a control system which comprises means at said control station to generate control current impulses in response to an increase of the total load on said network above a set value, switch means at said consuming devices of restricted load responsive to said current control impulses to disconnect said devices from said network and means at said control station for automatically increasing the setting of the load value at which said control current generator becomes operative.

12. In an electrical supply network having at least one control station and a plurality of remote current consuming devices of restricted load character connected to said network, a control system which comprises a circuit including a control current generator at each control station, a switch adapted to open and close said circuit, spring means tending to hold said switch open, a control member at each control station energized by an overload in said network to close said switch against said spring, a resetting member energized by closing of said circuit to increase the pressure of said spring after a predetermined time interval, means to superpose control currents generated on closing of said circuit on said supply network and switch means at said consuming devices of restricted load responsive to said control currents to disconnect said devices from said network.

13. In an electrical supply network having at least one control station and a plurality of remote current consuming devices of restricted load character connected to said network, a control system which comprises a circuit including a control current generator at each control station, a switch adapted to open and close said circuit, spring means tending to hold said switch open, a control member at each control station energized by an overload in said network to close said switch against said spring, a resetting member energized by closing of said circuit to increase the pressure of said spring, means to superpose control currents generated on closing of said circuit on said supply network switch means at said consuming devices of restricted load responsive to said control currents to disconnect said devices from said network and a delaying device at each control station delaying the action of said resetting member until said consuming devices of restricted load have been disconnected from said network.

14. In an electrical supply network which includes at least one control station and a plurality of remote current consuming devices of restricted load character, a control system which comprises means at said control station to generate control current impulses in response to an increase of the total load on said network above a set value, means to superpose said control current impulses on said supply network, switch means at said consuming devices of restricted load responsive to said control current impulses to disconnect said devices from said network, and selective means associated with said switch means to control the disconnection of said consuming devices successively in units.

15. In an electrical supply network which includes at least one control station and a plurality of remote current consuming devices of restricted load character provided with energy storage medium, a control system which comprises means at said control station to generate control current impulses in response to an increase of the total load on said network above a set value, means to superpose said control current impulses on said supply network, switch means at said consuming devices of restricted load responsive to said control current impulses to disconnect said devices from said network, selective means associated with said switch means to control the disconnection of said consuming devices successively in units, and means to maintain each of said units disconnected from said network for a period dependent on the ratio of the existing capacity of said energy storage medium to the maximum capacity thereof.

EDISON HALLOWELL.